S. SOULES.
POTATO DIGGER.
No. 69,136. Patented Sept. 24, 1867.
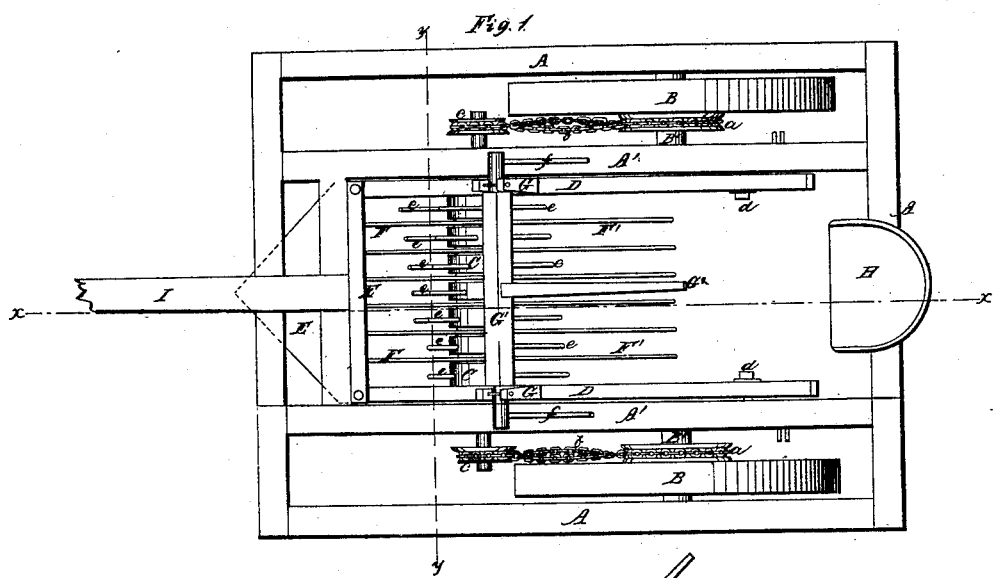
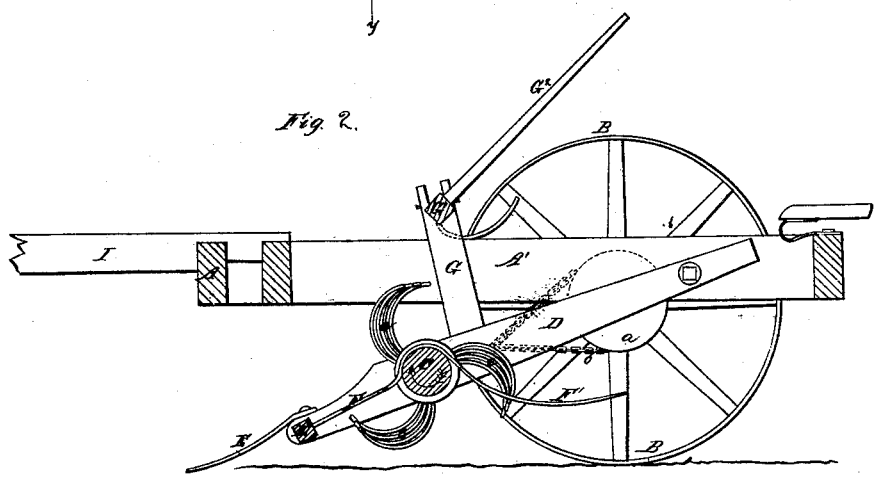

United States Patent Office.

SIMON SOULES, OF CRESCO, IOWA.

Letters Patent No. 69,136, dated September 24, 1867.

---

IMPROVEMENT IN POTATO-DIGGERS.

---

*The Schedule referred to in these Letters Patent and making part of the same.*

---

TO WHOM IT MAY CONCERN:

Be it known that I, SIMON SOULES, of Cresco, in the county of Howard, and State of Iowa, have invented a Potato-Digger; and I do hereby declare the following to be a full, clear, and exact description thereof, reference being had to the accompanying drawings, making part of this specification, in which—

Figure 1 is a plan view of my improved machine, arranged as a potato-digger.

Figure 2 is a longitudinal section through the potato-digger, taken in the vertical plane indicated by the red line $x\ x$ in fig. 1.

Similar letters of reference indicate corresponding parts in the several figures.

This invention relates to certain new and useful improvements on machinery for digging potatoes and separating them from earth.

The invention consists chiefly in the application to an adjustable vibrating frame, which is supported by a carriage having two driving-wheels, of a scoop or shovel, for ploughing up the potatoes mixed with earth, which scoop terminates at its rear end in a wire grating or screen for allowing the loose earth to fall through, and in combining therewith a series of revolving curved arms, which are so arranged as to raise the potatoes from the front part of the screen and transfer them to the rear part thereof, at the same time passing through the screen and carrying with them the earth, leaving the potatoes free from earth upon the screen, all as will be hereinafter described. It also consists in providing for allowing the person riding upon the machine to raise the shovel or scoop, with its revolving separator and screen, free from the ground, at pleasure, so that such person can deposit the potatoes upon the ground whenever desired, as will be hereinafter described.

To enable others skilled in the art to understand my invention, I will describe its construction and operation.

In the accompanying drawings, A represents a rectangular frame, consisting of longitudinal and transverse beams suitably secured together, and A' A' represent two longitudinal beams, which are secured at their ends to the front and rear transverse beams of frame A, so as to be parallel to the longitudinal beams thereof, as shown in fig. 1. This frame is mounted upon two driving and transporting-wheels B B, having separate short axles, B' B', applied beneath the two longitudinal beams A A' on both sides of the frame. The inner portions of the hubs of the wheels B B are constructed with annular grooves in them, as shown at $a\ a$, fig. 1, for receiving chain belts $b\ b$, which are crossed and passed around pulleys $c\ c$, on the extremities of the shaft of a revolving drum, C, hereinafter to be described. To the inner sides of the longitudinal beams A' A', and pivoted to them by bolts $d\ d$, are two vibrating beams D D, which incline forward, and have a wide scoop or pointed shovel, E, applied to their front ends, as shown in figs. 1 and 2. In rear of this shovel E, and secured to a transverse bar, E', beneath its upper edge, a screen, F F', is arranged, for separating the earth from the potatoes deposited upon it from the shovel. This screen consists in a number of wire rods, arranged in a direction with the length of the machine, at such distances apart as to allow loose earth to fall through, but to arrest the potatoes. The wires of the screen pass backward over the revolving drum C, and extend some distance in rear of this drum, as shown in figs. 1 and 2. It will be seen that the drum C has a number of annular grooves in its circumference corresponding to the number and distance apart of the screen wires, and it will also be seen that these screen wires are bent, so as to pass over the drum C and lie in the grooves therein. The object of this arrangement is to keep the said wires at regular distances apart, and prevent them from lateral displacement. To the drum C are secured three rows of curved arms, $e\ e\ e$, which are made of strong spring wire of suitable gauge, and arranged so that all curve in the same direction, as shown in figs. 1 and 2. These curved arms are secured to their drum in spiral lines, running from end to end thereof, so they will operate successively upon the earth and vines which lie upon the screen, and impel the same through or between the bars of the screen. Two standards, G G, are secured to the upper edges of the inclined beams D D, and project above the upper surface of the carriage-frame A, carrying upon their upper ends a transverse rocking-bar, G', to which two curved rods or cams, $f\ f$, are secured, which rest upon the beams A' A', and thus support the forward part of the inclined beams D, and their digging and separating devices. To the middle of the length of said rock-shaft $G^1$ an arm, $G^2$, is secured, which extends backwards to a position convenient to a person sitting upon the seat H, who can, by depressing this arm, raise the shovel E from the ground.

The horses being attached to the draught-pole I and the machine drawn along, the driver, sitting upon the seat H, raises the lever $G^2$, and allows the shovel E to enter the soil beneath the potatoes, and at the same time the chain belts $b$ will communicate motion to the drum C, causing it to revolve in the direction indicated by the arrow in fig. 2, and pick up the potatoes mixed with earth from the front part F of the screen, and carry them over upon the rear part of the screen. In thus passing around and successively transferring the potatoes from the front to the rear parts of the screen, the curved arms $e\ e\ e$ will divide and pulverize the lumps of earth and separate earth from the potatoes, leaving the latter upon the screen to be dropped off behind.

Having described my invention, what I claim as new, and desire to secure by Letters Patent, is—

1. The combination with the vibrating shovel, carrying beams D D, and the devices G $G^1$, $f$, and $G^2$, of a screen and revolving separator, the latter receiving its motion from the driving and transporting-wheels, substantially as described.

2. The construction of the screen F F′, in combination with curved separating arms $e\ e$, applied to a revolving shaft, C, said screen and shaft being supported upon a vibrating shovel-carrying frame, substantially as described.

3. Adapting the grooved drum C, carrying arms $e$, to serve as a support for and a means of keeping in place the rods composing the screen, substantially as described.

4. Arranging the drum C, with its curved arms $e$, in such manner that these arms serve as elevators for transferring the potatoes from the front to the rear portions of the screen F, and at the same time serve as separators for freeing the potatoes from earth, substantially as described.

SIMON SOULES.

Witnesses:
W. R. MEAD,
WILLIAM B. DOBSON.